United States Patent
Van Geest et al.

(10) Patent No.: US 7,692,640 B2
(45) Date of Patent: Apr. 6, 2010

(54) MOTION CONTROL FOR IMAGE RENDERING

(75) Inventors: Bartolomeus Wilhelmus Damianus Van Geest, Eindhoven (NL); Marc Joseph Rita Op De Beeck, Eindoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 1045 days.

(21) Appl. No.: 10/573,559

(22) PCT Filed: Sep. 22, 2004

(86) PCT No.: PCT/IB2004/051821

§ 371 (c)(1),
(2), (4) Date: Mar. 27, 2006

(87) PCT Pub. No.: WO2005/031652

PCT Pub. Date: Apr. 7, 2005

(65) Prior Publication Data

US 2007/0035530 A1    Feb. 15, 2007

(30) Foreign Application Priority Data

Sep. 30, 2003  (EP)  .................................. 03103608

(51) Int. Cl.
*G06F 3/038* (2006.01)

(52) U.S. Cl. ........................ 345/204; 359/462; 348/49

(58) Field of Classification Search .................. 345/204, 345/6, 427, 419; 359/376, 378, 462, 464, 359/466–470; 348/42, 43, 46, 49–51, 53–55, 348/169; 382/276, 263, 286, 291, 295
See application file for complete search history.

(56) References Cited

U.S. PATENT DOCUMENTS

| | | | |
|---|---|---|---|
| 5,373,857 A * | 12/1994 | Travers et al. | 600/595 |
| 5,574,836 A | 11/1996 | Broemmelsiek | |
| 5,742,332 A | 4/1998 | Imai et al. | |
| 6,271,875 B1 | 8/2001 | Shimizu et al. | |
| 2003/0035001 A1 * | 2/2003 | Van Geest et al. | 345/753 |

FOREIGN PATENT DOCUMENTS

| | | |
|---|---|---|
| EP | 0583060 A2 | 2/1994 |
| EP | 1154655 A2 | 11/2001 |
| WO | WO0229718 A2 | 4/2002 |
| WO | WO03017680 A1 | 3/2003 |

OTHER PUBLICATIONS

Colgate et al: "Factors Affecting the Z-Width of a Haptic Display"; Robotics and Automation, 1994 Proceedings—1994 IEEE International Conference, San Diego, CA, USA May 8-13, 1994, Los Alamitos, CA, USA, IEEE Computer Soc., pp. 3205-3210, XP010097558.

(Continued)

*Primary Examiner*—Jimmy H Nguyen (57) ABSTRACT

A display apparatus (100) for displaying an output image on basis of 3D visual information is disclosed. The display apparatus (100) comprises: first receiving means (101) for receiving a first signal (3DV) representing the 3D visual information; second receiving means (116) for receiving a second signal (P) representing positional information of a viewer of the output image, as function of time; filtering means (122) for high-pass filtering the second signal (P), resulting in a third signal (PF); rendering means (118) for rendering the output image on basis of the first signal (3DV) and the third signal (PF); and display means (112) for displaying the output image.

15 Claims, 5 Drawing Sheets

OTHER PUBLICATIONS

Bishop, M. "Efficient Reconstruction Techniques for Post-Rendering 3D Image Warping"; UNC CS Technical Report, Mar. 21, 1998, pp. 1-14, XP002312619.

Fehn et al "3D Analysis and Image-Based Rendering for Immersive TV Applications"; Signal Processing, Image Communication, Elsevier Science Publishers, Amsterdam, NL., vol. 17, No. 9, Oct. 2002, pp. 705-715, XP004388881.

Chen et al: "View Interpolation for Image Synthesis", Computer Graphics Annual Conference Series, Proceedings of SIGGRAPH 93, pp. 279-288, 1993.

International Search Report for International Application No. PCT/IB2004/051821 Contained in World Publication No. WO2005031652, Feb. 2, 2005.

Written Opinion of the International Searching Authority for International Application No. PCT/IB2004/051821, Feb. 2, 2005.

* cited by examiner

MOTION CONTROL FOR IMAGE RENDERING

The invention relates to a display apparatus for displaying an output image on basis of 3D visual information.

The invention relates to a method of displaying an output image on basis of 3D visual information.

The invention further relates to a computer program product to be loaded by a computer arrangement, comprising instructions to render an output image on basis of 3D visual information, the computer arrangement comprising processing means and a memory.

In the field of 3D-visualisation, a number of depth cues are known that contribute to a 3D perception. Two of them are stereoscopy and interactive motion parallax. With stereoscopy, the eyes of the viewer are presented with images that have a slightly different perspective viewpoint of the scene being visualized. With interactive motion parallax, the perspective viewpoints being visualized are adaptive with respect to the viewer's head position.

In the following, two examples of presenting these depth cues to a viewer are briefly described. In the first example the three-dimensional (3D) visual information is represented by means of a geometric 3D-model. The application domain comprises synthesized content, i.e. computer graphics, e.g. gaming and Computer Aided Design (CAD). Here, the scenes that are to be visualized are described by a geometric 3D-model, e.g. VRML (Virtual Reality Modeling Language). Information about the viewer's head position, measured with a so-called head-tracker, is used to set the viewpoint, as a parameter, in the stereo image synthesis (rendering). The left and right views are e.g. time-multiplexed on a CRT-based monitor and an electro-optical switch in combination with passive glasses, based on polarization, enables the 3D visualization. This type of visualization is illustrative only, alternatives can be used including auto-stereoscopy.

The second example applies to the 3D visualization of image based content. The 3D visual information is represented by means of images and corresponding depth maps. The data in this format is e.g. stored and exchanged as Red, Green, Blue and Depth (RGBD). That means that each pixel has been annotated a depth value that indicates the distance of the corresponding scene point to the camera. The depth part in this representation might have been obtained in one of several ways. E.g. recorded directly together with the image data using a depth-range camera or obtained from stereographic recordings using disparity estimation. The adaptive synthesis of images with new viewpoints from this input material is accomplished using so-called image warping techniques, e.g. as described in "View interpolation for image synthesis", by Shenchang Eric Chen and Lance Williams, in Computer Graphics Annual Conference Series, Proceedings of SIGGRAPH 93, pages 279-288. This warping basically comes down to the re-sampling of the pixels of the original input image to an extent that is inversely proportional to the depth values and subsequently the re-sampling of the obtained data. When using this method a problem arises since the images get distorted by the warping process. The amount of distortion depends on the applied viewpoint offset but also on the image content: If the depth representation i.e. depth map comprises relatively many discontinuities, it will frequently occur that in certain areas of the new image objects should re-appear: de-occlusion. This information is not available since the object was occluded in the original image. This leaves holes in the synthesized image that should be filled in one way or the other but in any way degrades the image quality. The amount in which this degradation is perceived by the viewer again depends on the content: when the background around the object has a homogeneous nature, the stuffing of the holes with other background information will be less disturbing. When applied to interactive motion parallax, the distortions might be severe for relatively large head movements e.g. if a viewer moves his chair.

It is an object of the invention to provide a display apparatus of the kind described in the opening paragraph which is arranged to render a default image corresponding to a predetermined view of the 3D visual information if a tracked viewer is hardly moving during a particular amount of time.

This object of the invention is achieved in that the display apparatus comprises:
first receiving means for receiving a first signal representing the 3D visual information;
second receiving means for receiving a second signal representing positional information of a viewer of the output image, as function of time, the positional information being relative to the display apparatus;
filtering means for high-pass filtering the second signal, resulting in a third signal;
rendering means for rendering the output image on basis of the first signal and the third signal; and
display means for displaying the output image.

An important aspect of the invention is the filtering of the second signal representing positional information of the viewer of the image. By filtering the second signal, there is no linear relation between the actual positional information and the output of the rendering means, but there is a relation between the change of the actual positional information per unit of time and the output of the rendering means. That means that if the change of actual positional information during a particular amount of time is zero, i.e. if the speed of the viewer is zero, then the output of the filtering means is equal to zero. As a consequence the rendering means will render the default image corresponding to a default positional information, being a predetermined view of the 3D visual information. On the other hand, if the change of actual positional information during a particular amount of time is relatively large, i.e. if the speed and/or acceleration of the viewer is relatively large, then the output of the filtering means is relatively high, resulting in a sequence of output images being rendered, corresponding to relatively large angles related to the default image. The advantage of the display apparatus according to the invention is that it is arranged to react on swift movements of the viewers head, corresponding to movements intended to observe the interactive motion parallax, while it is arranged to display a preferred default image if a recent movement was not intended as such but e.g. caused by just taking another position or moving the chair on which the viewer is sitting. In the latter case, the display apparatus will eventually converge to a state in which the said default image is displayed if after the recent movement the viewer is hardly moving for a while.

The 3D visual information might be represented in several ways: as a 3D-model in VRML, as a volume set of voxels, as a set of surface descriptions or as an image plus depth map.

In an embodiment of the display apparatus according to the invention the 3D visual information comprises an input image and a corresponding depth map and the input image and the output image are substantially mutually equal for a predetermined value of the third signal, while for a further value of the third signal the output image represents a different view on a scene than a first view on the scene corresponding to the input image. In other words, the display apparatus according to the invention displays an output image with a minimum of distortion. So, the image quality is optimal if the viewer has not been moving for a while. There might be minor differences between the input image and the output image, i.e. the images are substantially mutually equal and not necessarily exactly equal. These differences might e.g. be caused by minor warping operations, quantization, or other image processing operations performed to compute the output image on basis of the input image.

An embodiment of the display apparatus according to the invention further comprises clipping means for clipping the third signal between a lower limit and an upper limit. The third signal originating from the head-tracker is filtered in such a way that relatively large viewpoint offsets are prevented. This prevents the associated distortion at the cost of viewpoint adaptivity for relatively large head movements.

An embodiment of the display apparatus according to the invention, further comprises content analyzing means for analyzing the 3D visual information and/or the output image and for controlling the filtering means and/or the clipping means. Preferably the content analyzing means is arranged to determine a measure of a set of measures comprising a first measure corresponding to the number of discontinuities in the depth map, a second measure corresponding to the homogeneity of the background of the input image and a third measure corresponding to the number of holes in the output image. The applied control is preferably as follows:

the content analyzing means is arrange to increase the lower limit and/or decrease the upper limit if the first measure is relatively high or the second measure is relatively low or the third measure is relatively high; and the content analyzing means is arrange to decrease the cut-off frequency of the filtering means if the first measure is relatively high or the second measure is relatively low or the third measure is relatively high.

Alternatively, the control signal is determined offline and embedded into the 3D visual information as meta data.

Preferably the display apparatus is a multi-view display device being arranged to render a further output image and to display the output image in a first direction and to display the further output image in a second direction. In other words, it is advantageous to apply the invention in a 3D display apparatus or also called stereoscopic display apparatus.

It is a further object of the invention to provide a method of the kind described in the opening paragraph, to render a default image corresponding to a predetermined view of the 3D visual information if a tracked viewer is hardly moving during a particular amount of time.

This object of the invention is achieved in that the method comprises:

receiving a first signal representing the 3D visual information;

receiving a second signal representing positional information of a viewer of the output image, as function of time, the positional information being relative to a display apparatus;

high-pass filtering the second signal, resulting in a third signal;

rendering the output image on basis of the first signal and the third signal; and displaying the output image.

It is a further object of the invention to provide a computer program product of the kind described in the opening paragraph, to render a default image corresponding to a predetermined view of the 3D visual information if a tracked viewer is hardly moving during a particular amount of time.

This object of the invention is achieved in that the computer program product, after being loaded, provides said processing means with the capability to carry out:

receiving a first signal representing the 3D visual information;

receiving a second signal representing positional information of a viewer of the output image, as function of time, the positional information being relative to a display apparatus;

high-pass filtering the second signal, resulting in a third signal; and rendering the output image on basis of the first signal and the third signal.

Modifications of the display apparatus and variations thereof may correspond to modifications and variations thereof of the method and the computer program product, being described.

These and other aspects of the display apparatus, of the method and of the computer program product, according to the invention will become apparent from and will be elucidated with respect to the implementations and embodiments described hereinafter and with reference to the accompanying drawings, wherein:

Same reference numerals are used to denote similar parts throughout the Figures.

Figure 1:
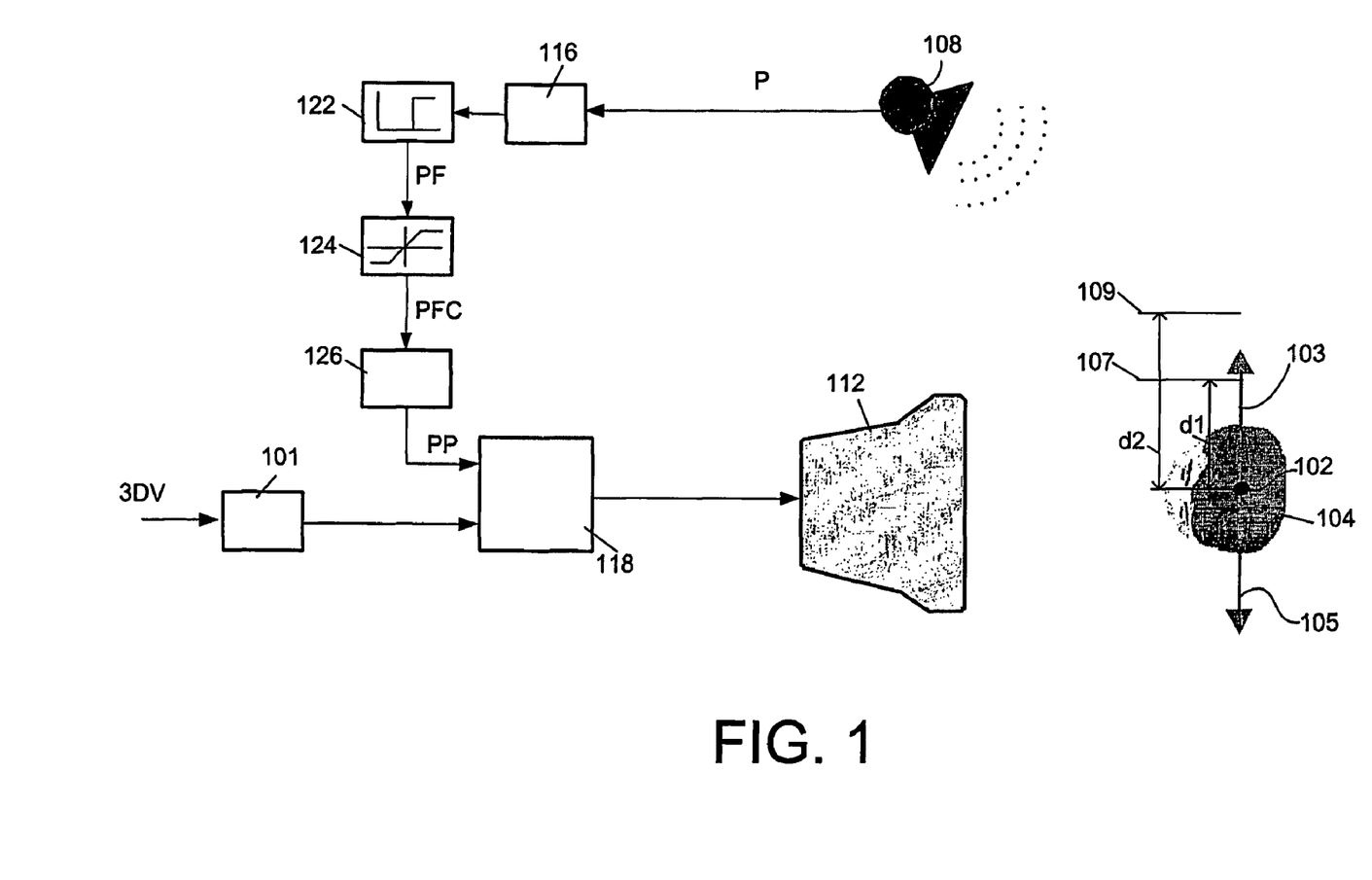
FIG. 1 schematically shows an embodiment of the display apparatus according to the invention.

FIG. 1 schematically shows an embodiment of the display apparatus 100 according to the invention. The display apparatus 100 is arranged to displaying an output image on basis of 3D visual information and positional information being provided. Typically, the display apparatus 100 is connected to a head-tracker 108 which is arranged to determine the position 102 of an observer 104, i.e. viewer, relative to the display apparatus 100. Alternatively, the display apparatus 100 comprises such a head-tracker 108. The position 102 of the observer 104 may be sensed by an ultrasonic tracking system or the observer 104 may wear a magnet to indicate his position 102 to a magnetic tracking system. In a further embodiment one or more cameras may scan the viewing region to determine the observer's position, for instance supplying image data to a system which recognizes the eyes of the observer. In yet a further embodiment the observer 104 wears a reflector which reflects electromagnetic energy, such as infrared energy. A scanning infrared source and an infrared detector or a wide angle infrared source and a scanning infrared detector determine the position of the reflector which is preferably worn between the eyes of the observer 104.

The display apparatus 100 comprises:

a first input unit 101 for receiving a first signal 3DV representing the 3D visual information;

a second input unit 116 for receiving a second signal P representing the positional information of the observer as function of time;

a highpass filter unit 122 for high-pass filtering the second signal P, resulting in a third signal PF;

a rendering unit 118 for rendering the output image on basis of the first signal 3DV and the third signal PF; and a display device 112 for displaying the output image.

The display apparatus 100 optionally comprises a clipping unit 124 for clipping the second signal PF third signal between a lower limit and an upper limit, resulting in a fourth signal PFC.

The display apparatus 100 optionally comprises a signal transformation unit 126 to transform the fourth signal PFC into a fifth signal PP having values which are appropriate for the rendering. The transformation might comprise a scaling or a mapping between coordinate systems, e.g. form world coordinates of the observer into view coordinates of the 3D visual information or from Cartesian coordinates into pole coordinates.

Figure 2:
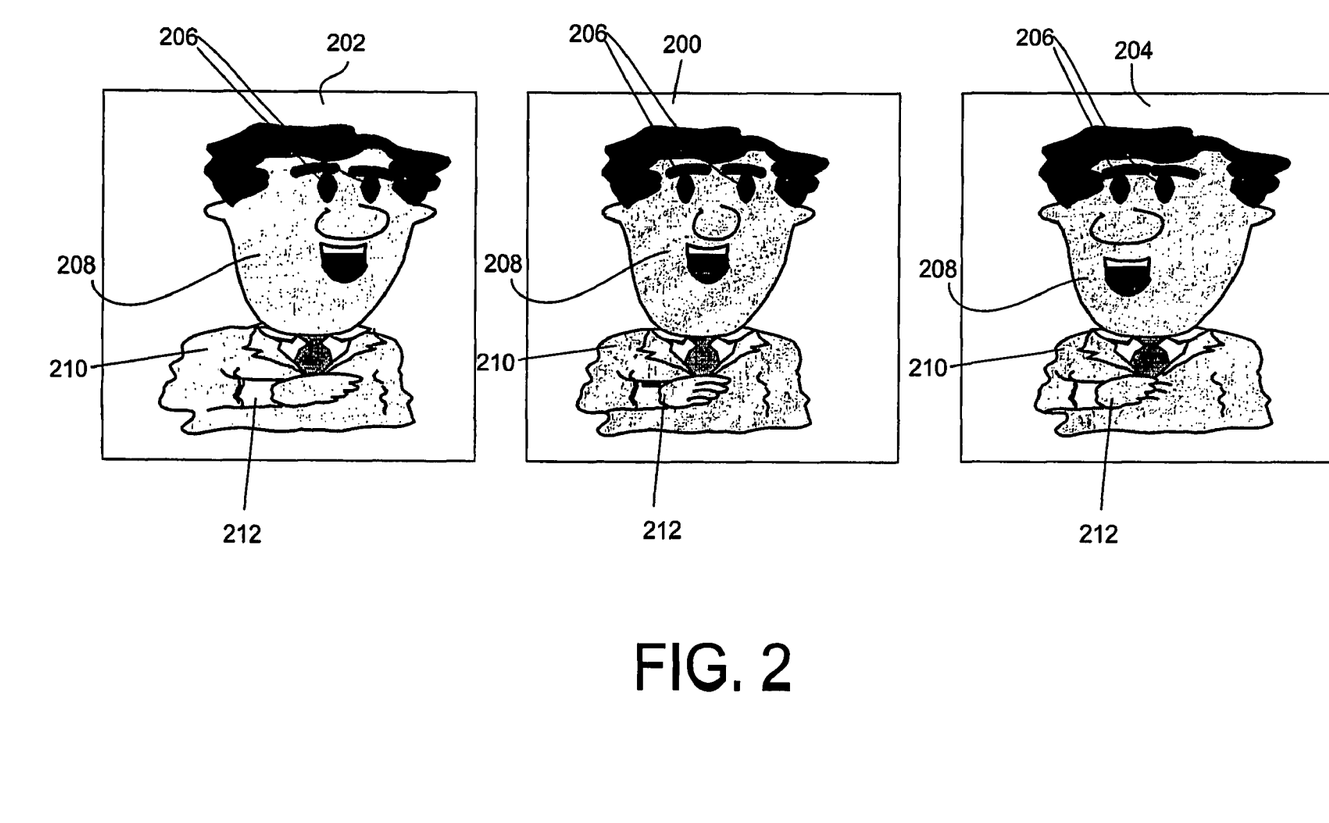
FIG. 2 shows three different output images which are generated by means of the display apparatus of FIG. 1.

The working of the display apparatus 100 will be described below, in connection with FIG. 1 and FIG. 2. FIG. 2 shows three different output images 200-204 which are generated by means of the display apparatus 100 according to the invention. Assume that the first signal 3DV comprises an input image and a corresponding depth map. Suppose that the observer 104 is located at a particular position 102 in front of the display device 112, at a particular point in time. This particular position 102 corresponds with the spatial origin of the coordinate system of the head-tracker 108. The display apparatus 100 displays a first 200 one of the output images. This first 200 one of the output images represents a portion of a person, i.e. a head 208, shoulders 210 and a right arm 212. It looks as if the observer 104 can watch the person straight in the eyes 206. This first one 200 of the output images is substantially equal to the input image being provided to the display apparatus 100.

Next, the observer 104 is moving swiftly in a direction indicated with a first arrow 105. The head-tracker 108 detects the movement and outputs the second signal P accordingly. The second signal is highpass filtered by means of the high-pass filter unit 122. The output of the high-pass filter unit 122 is optionally clipped and transformed and eventually provided to the rendering unit 118. Consequently, the rendering unit 118 starts computing a series of output images on basis of the input image, the depth map and the filtered positional information. Each of the output images based on a different value of the processed signal corresponding to the positional information. The output images are preferably computed as described in "View interpolation for image synthesis", by Shenchang Eric Chen and Lance Williams, in Computer Graphics Annual Conference Series, Proceedings of SIGGRAPH 93, pages 279-288. A second 204 one of the series of output as being displayed on the display device 112 is depicted in FIG. 2. This second 204 one of the output images represents the portion of the person, i.e. the head 208, the shoulders 210 and the right arm 212. But now it looks as if the observer 104 can not watch the person straight in the eyes 206, but as if the person has rotated his head 208 a bit to the left.

If the observer 104 subsequently moves relatively swiftly to the opposite direction, i.e. in the direction indicated with the second arrow 103 then a similar process is executed. The consequence is that the observer 104 will be shown a third 204 one of the output images. This third 204 one of the output images also represents the portion of the person, i.e. the head 208, the shoulders 210 and the right arm 212. Again it looks as if the observer 104 can not watch the person straight in the eyes 206. However now it looks as if the person has rotated his head 208 a bit to the right.

The clipping unit 124 will clip the third high-pass filtered signal PF if it exceeds predetermined thresholds. Consequently, the observer 104 is presented with the same third 204 one of the output images for both positions 107 and 109 corresponding to the distances d1 and d2 related to the origin 102, respectively.

As described above, because of movements the observer 104 is presented with different output images 200-204 corresponding to different views on a scene. In this exemplary case the scene comprises a talking person. This image presentation phenomena is called interactive motion parallax.

Suppose that the observer is located on a second location 107 and has not been moving for a while, e.g. 1-5 seconds. As a consequence the value of the high-pass filtered third signal PF equals zero. The rendering unit 118 will generate the default output image, i.e. the first one 200 of the output images.

If the observer starts moving from the second location 107 in a direction indicated with the second arrow 103 then the observer will be presented with the third 204 one of the output images. If the observer starts moving from the second location 107 in the opposite direction indicated with the first arrow 105 then the observer will be presented with the second 202 one of the output images.

The first input unit 101, the second input unit 116, the high-pass filter unit 122, the clipping unit 124, the rendering unit 118 and the signal transformation unit 126 may be implemented using one processor. Normally, these functions are performed under control of a software program product During execution, normally the software program product is loaded into a memory, like a RAM, and executed from there. The program may be loaded from a computer-readable storage medium such as a background memory, like a ROM, hard disk, or magnetically and/or optical storage, or may be loaded via a network like Internet. Optionally an application specific integrated circuit provides the disclosed functionality.

Figure 3:
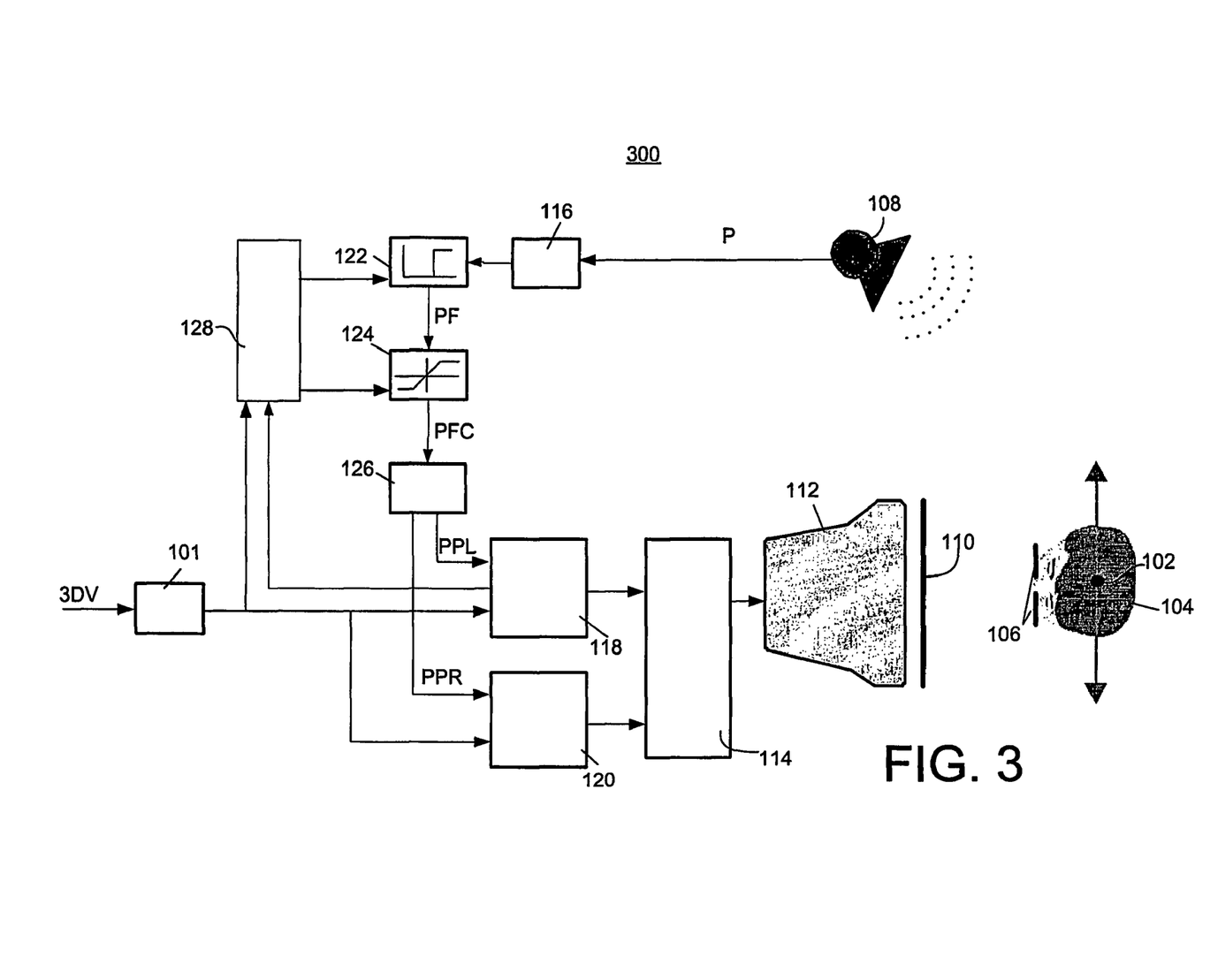
FIG. 3 schematically shows an embodiment of a stereoscopic display apparatus according to the invention.

FIG. 3 schematically shows an embodiment of a stereoscopic display apparatus 300 according to the invention. The working of this embodiment 200 is substantially equal to the working of the embodiment 100 as described in connection with FIGS. 1 and 2. Some differences are described below.

The stereoscopic display apparatus 300 comprises a rendering unit 118 for rendering a left-eye output image and a further rendering unit 120 for rendering a right-eye output image, the left-eye output image and the right-eye output image forming a stereo pair. Both output images of the stereo pair are computed as described in connection with FIG. 1, albeit, that for the rendering unit 118 and the further rendering unit 120 different positional information signals PPL and PPR are provided. The difference between these two signals PPL and PPR is related to the distance (or assumed distance) between the eyes of the observer 104. The left-eye output image and right-eye output image are time-multiplexed by means of the multiplexer unit 114 and displayed on the CRT-based display device 112. The electro-optical switch 110 in combination with passive glasses 106, based on polarization, enables the stereoscopic visualization. This type of visualization is illustrative only, alternatives can be used including auto-stereoscopy.

Figure 4:
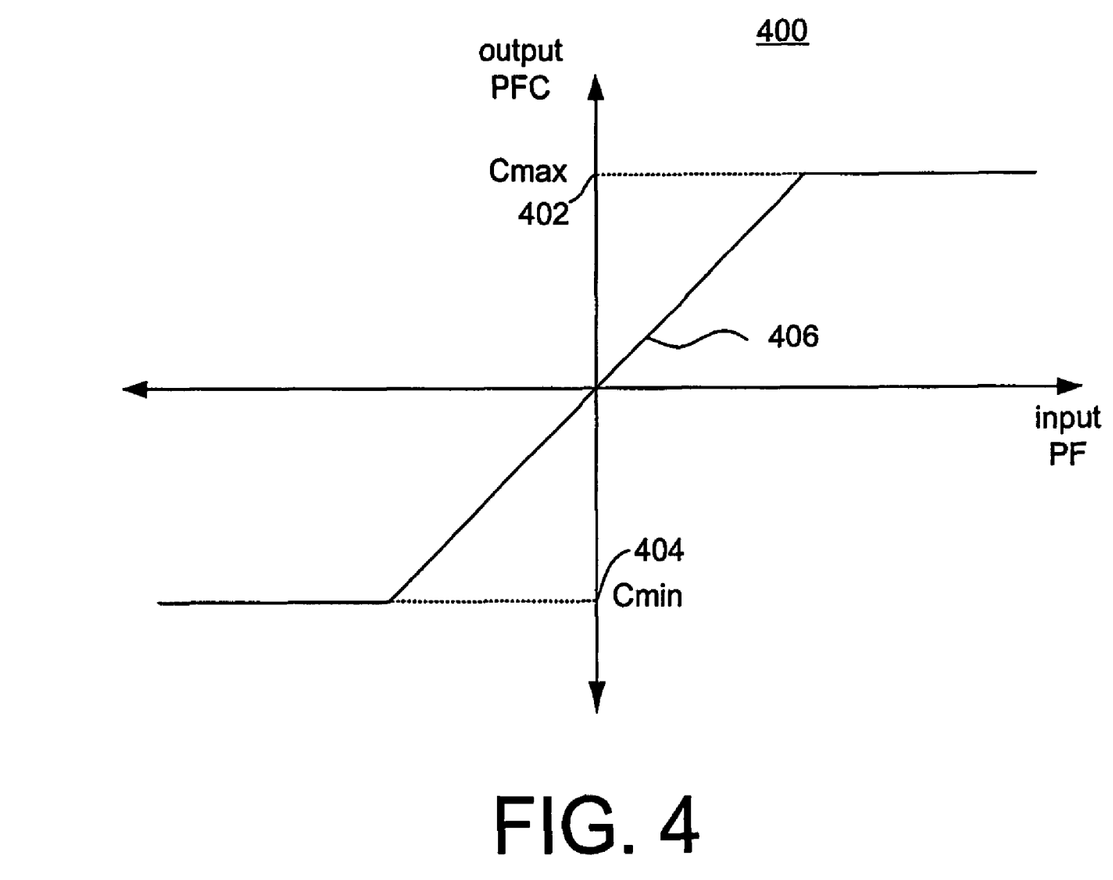
FIG. 4 schematically shows the transfer characteristic of the clipping unit.

The stereoscopic display apparatus 300 further comprises an image content analyzer 128 being arranged to control the clipping unit 124 and the high-pass filter unit 122. The behavior of the display apparatus 300 is such that an appropriate image quality of the output images is aimed at. That means that, the clipping unit 124 narrows its linear part 406 of the transformation characteristic 400 in the case of output images with expected lower quality. Narrowing the linear part corresponds to decreasing the maximum output value Cmax 402 and or increasing the minimum output value Cmin 404. The expectation can be based on the number of holes counted during the warping of the input image into the output images or the analyses of the background of the input images. Analyses of the background preferably comprises texture analyses, e.g. by means of high-pass filtering the input image optionally followed by a thresholding operation. The existence of relatively many high-frequency components is an indication for a detailed background.

Preferably use is made of information about the background, during the warping. A known method to reduce the distortion problems is to supplement the image plus depth with information about occluded areas: Such information is available for image plus depth information obtained from stereo recordings. Furthermore, an increasingly amount of movies are making use of chroma keying. This is a method wherein the movie-cast acts in front of a blue or green background being located inside a film studio. Later on, in the editing stage, the original blue or green background is replaced (keyed out) by the intended background, which can be based on al kinds of film material, e.g. shot outdoor, small scale, or even computer generated material. For such cases, the complete background, including the parts which are occluded by the actors, is available and can be exchanged in combination with the image plus depth information. The video coding standard MPEG-4 supports such supplements by using so-called enhancement layers.

As said, the behavior of the display apparatus 300 is such that an appropriate image quality of the output images is aimed at. That means that the high-pass filter unit 122 reacts faster to return to the default output image 200 in the case of output images with expected lower quality. The expectation can be based on the number of holes counted during the warping of the input image into the output images or the analyses of the background of the input images. The estimation of the number of discontinuities in the depth map is another way of quantifying the expected image quality.

Although, the 3D visual information is provided as image plus depth map in the embodiments of the display apparatus 100 and 200 as described in connection with FIG. 1 and FIG. 3, respectively, it will be clear that alternative embodiments are able to receive the 3D visual information being represented in a different way, e.g. as a 3D-model in VRML, as a volume set of voxels or as a set of surface descriptions. In that case other types of rendering are performed by the rendering units 118 and 120.

Optionally the filter characteristic of the highpass filter unit 122 is controlled on basis of the clipping unit 124. The cut-off frequency is adapted depending on the fact whether the input PF of the clipping unit 124 is clipped or not. Besides that it is preferred that the high-pass filter unit 122 has a so-called asymmetric behavior, e.g. fast responds on movements but slow responds on being stationary.

The display apparatus might be part of a video conference system, a consumer device like a TV set or a gaming device.

Figure 5:
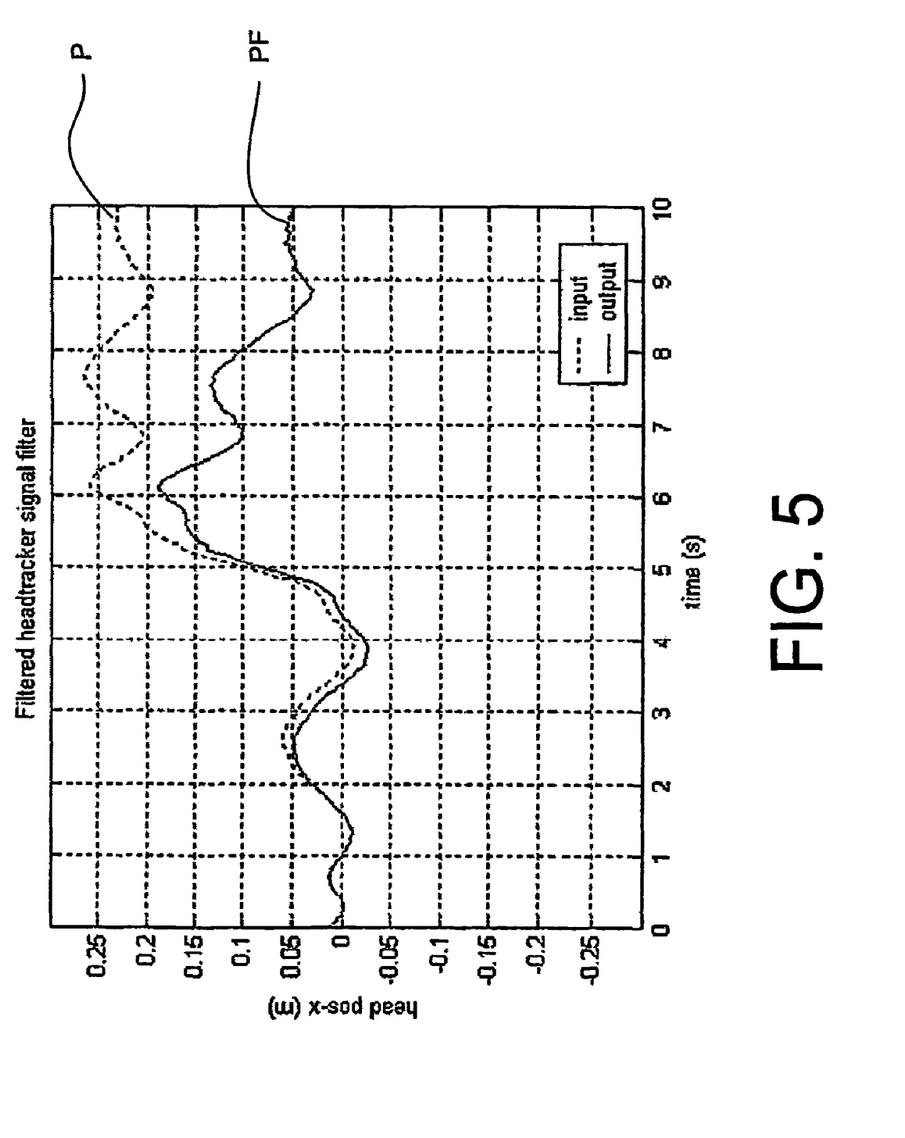
FIG. 5 shows a head-tracker signal provided by a head-tracker and the high-pass filtered signal derived from that head-tracker signal.

FIG. 5 shows an (input) head-tracker signal P provided by a head-tracker 108 and the (output) high-pass filtered signal PF derived from that head-tracker signal P. The applied filter is a first order high-pass filter with a cut-off frequency of 0.05 Hz. It can clearly be seen in FIG. 5 that the high-pass filtered signal PF matches relatively well with the head-tracker signal P for time=0 till time=5 seconds. After time=6 seconds the high-pass filtered signal PF slowly converses to the default value belonging to the particular position 102 corresponding with the spatial origin of the coordinate system of the head-tracker 108. In other words, the low-frequent part in the head-tracker signal P corresponding to a spatial offset of approximately 0.2-0.25 meter, is suppressed.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A display apparatus for displaying an output image on a basis of 3D visual information, the display apparatus comprising:
   first receiving means for receiving a first signal (3DV) representing the 3D visual information;
   second receiving means for receiving a second signal (P), the second signal (P) representing positional information of a viewer, as function of time, relative to the display apparatus;
   filtering means for high-pass filtering the second signal (P), resulting in a third signal (PF);
   rendering means for rendering the output image on a basis of the first signal (3DV) and the third signal (PF), wherein the third signal (PF) produced by high-pass filtering the second signal (P) provides a relation between (a)(i) a change of actual positional information per unit time and (a)(ii) the output of the rendering means such that (b)(i) for a change of actual positional information during a particular amount of time being zero, the output of the filtering means is zero and the rendering means renders a default image and (b)(ii) for a change of actual positional information during a particular amount of time being large, the output of the filtering means is high and the rendering means renders a sequence of output images corresponding to large angles related to the default image; and
   display means for displaying the output image.

2. A display apparatus as claimed in claim 1, wherein the 3D visual information comprises an input image and a corresponding depth map.

3. A display apparatus as claimed in claim 2, wherein for a predetermined value of the third signal (PF), the input image and the output image are substantially mutually equal.

4. A display apparatus as claimed in claim 2, further comprising clipping means for clipping the third signal to have values between a lower limit and an upper limit.

5. A display apparatus as claimed in claim 4, further comprising content analyzing means (i) for analyzing the 3D visual information and/or the output image and (ii) for controlling the filtering means and/or the clipping means in response to analyzing the 3D visual information and/or the output image.

6. A display apparatus as claimed in claim 5, wherein the content analyzing means is arranged to determine a measure of a set of measures comprising a first measure corresponding to the number of discontinuities in the depth map, a second measure corresponding to the homogeneity of the input image and a third measure corresponding to the number of holes in the output image.

7. A display apparatus as claimed in claim 6, wherein the content analyzing means is arranged to increase the lower limit and/or decrease the upper limit of the clipping means if the first measure is relatively high or the second measure is relatively low or the third measure is relatively high.

8. A display apparatus as claimed in claim 6, wherein the content analyzing means is arranged to decrease the cut-off frequency of the filtering means if the first measure is relatively high or the second measure is relatively low or the third measure is relatively high.

9. A display apparatus as claimed in claim 2, further comprising content analyzing means (i) for analyzing the 3D visual information and/or the output image and (ii) for controlling the filtering means and/or the clipping means in response to analyzing the 3D visual information and/or the output image.

10. A display apparatus as claimed in claim 9, wherein the content analyzing means is arranged to determine a measure of a set of measures comprising a first measure corresponding to the number of discontinuities in the depth map, a second measure corresponding to the homogeneity of the input image and a third measure corresponding to the number of holes in the output image.

11. A display apparatus as claimed in claim 10, wherein the content analyzing means is arranged to increase the lower limit and/or decrease the upper limit of the clipping means if the first measure is relatively high or the second measure is relatively low or the third measure is relatively high.

12. A display apparatus as claimed in claim 10, wherein the content analyzing means is arranged to decrease the cut-off frequency of the filtering means if the first measure is relatively high or the second measure is relatively low or the third measure is relatively high.

13. A display apparatus as claimed in claim 1, wherein the display apparatus is a multi-view display device being arranged to render a further output image and to display the output image in a first direction and to display the further output image in a second direction.

14. A method of displaying an output image on a basis of 3D visual information, the method comprising:

receiving a first signal (3DV) representing the 3D visual information;

receiving a second signal (P), the second signal (P) representing positional information of a viewer, as function of time, relative to a display apparatus;

high-pass filtering the second signal (P), resulting in a third signal (PF);

rendering the output image on a basis of the first signal (3DV) and the third signal (PF), wherein the third signal (PF) produced by high-pass filtering the second signal (P) provides a relation between (a)(i) a change of actual positional information per unit time and (a)(ii) the output image of the rendering such that (b)(i) for a change of actual positional information during a particular amount of time being zero, an output of the high-pass filtering is zero and rendering the output image includes rendering a default image and (b)(ii) for a change of actual positional information during a particular amount of time being large, the output of the high-pass filtering is high and rendering the output image includes rendering a sequence of output images corresponding to large angles related to the default image; and displaying the output image.

15. A computer-readable storage medium encoded with a computer program, the computer program comprising instructions to render an output image on a basis of 3D visual information, the computer program for being loaded and executed by a computer arrangement comprising processing means and a memory, the computer program, after being loaded, providing said processing means with the capability to carry out:

receiving a first signal (3DV) representing the 3D visual information;

receiving a second signal (P) representing positional information of a viewer, as function of time, relative to a display apparatus;

high-pass filtering the second signal (P), resulting in a third signal (PF);

rendering the output image on a basis of the first signal (3DV) and the third signal (PF), wherein the third signal (PF) produced by high-pass filtering the second signal (P) provides a relation between (a)(i) a change of actual positional information per unit time and (a)(ii) the output image of the rendering such that (b)(i) for a change of actual positional information during a particular amount of time being zero, an output of the high-pass filtering is zero and rendering the output image includes rendering a default image and (b)(ii) for a change of actual positional information during a particular amount of time being large, the output of the high-pass filtering is high and rendering the output image includes rendering a sequence of output images corresponding to large angles related to the default image; and causing a display to display the output image.

* * * * *